Figure 12:
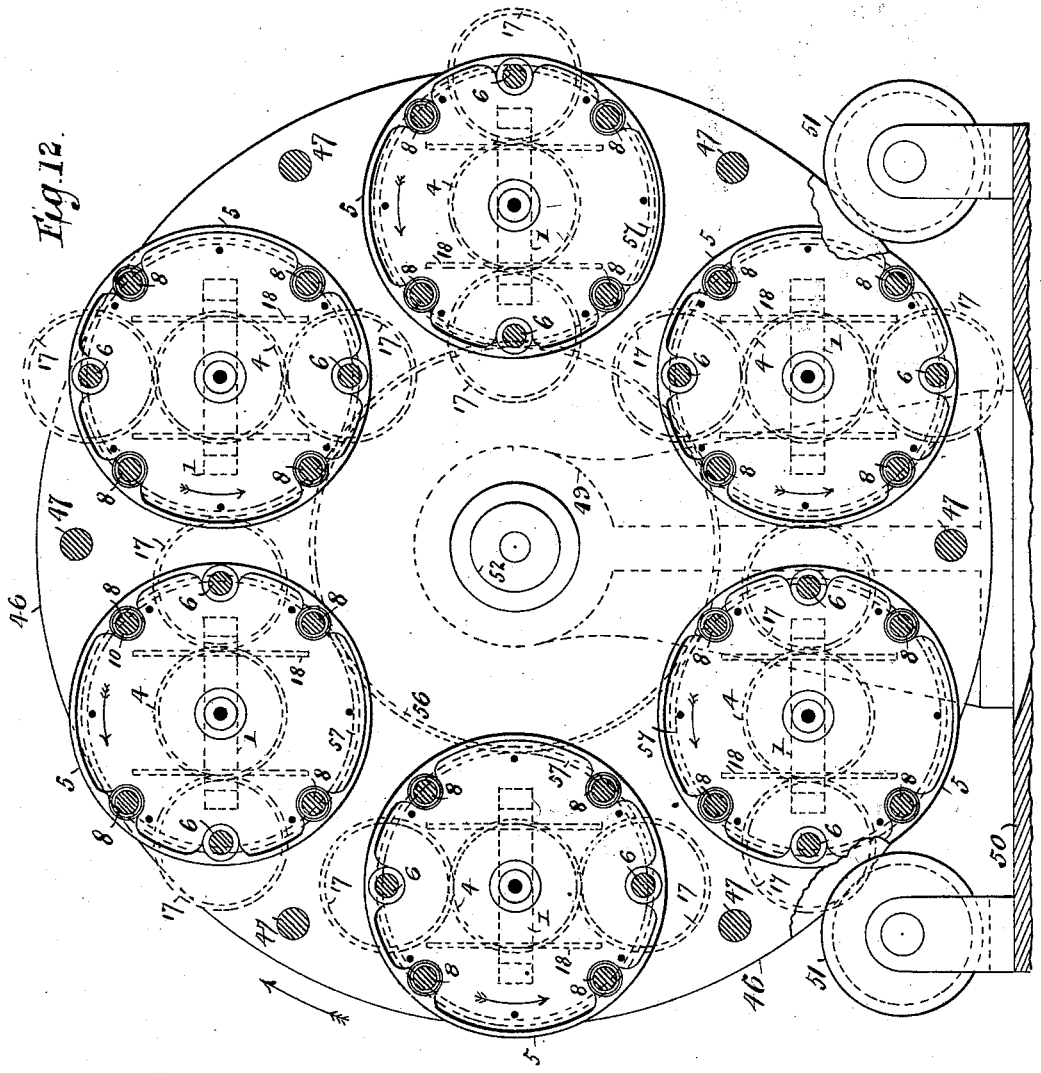

(No Model.) 5 Sheets—Sheet 1.
W. H. H. SISUM.
MACHINE FOR MAKING WIRE CORDS AND CABLES.
No. 477,784. Patented June 28, 1892.
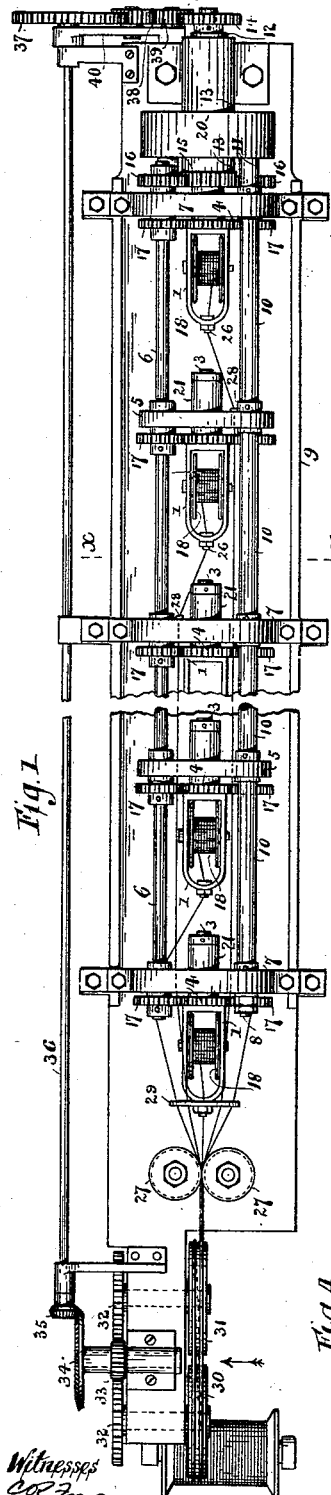
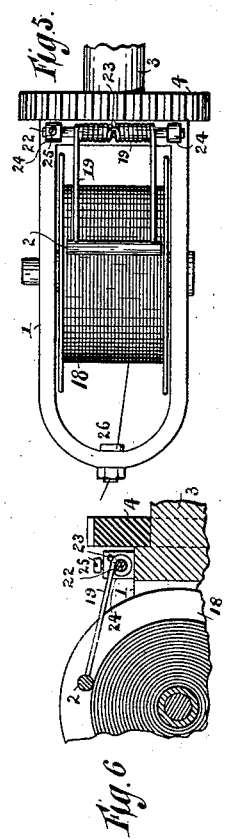
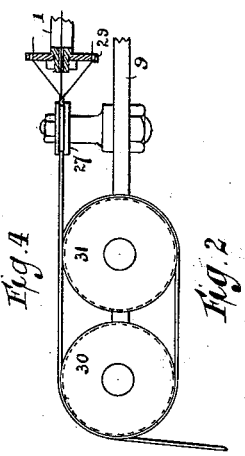
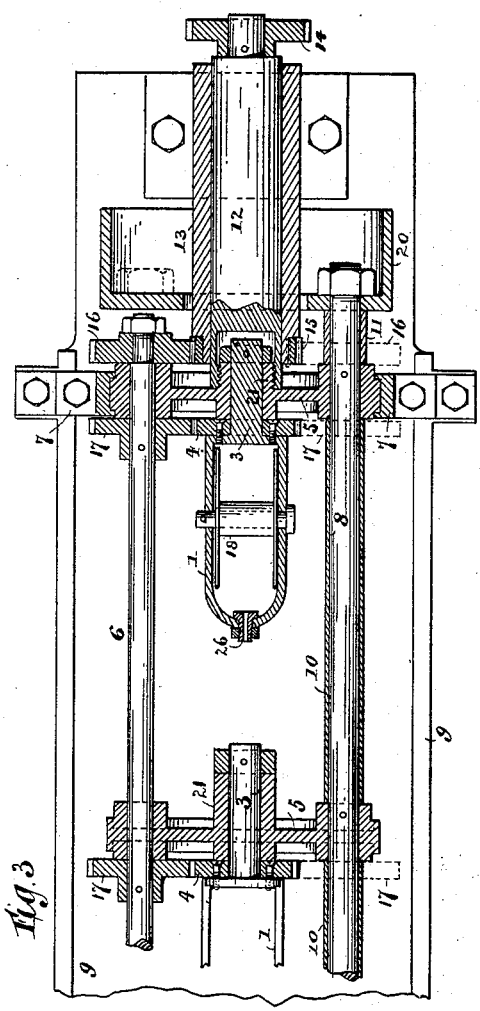
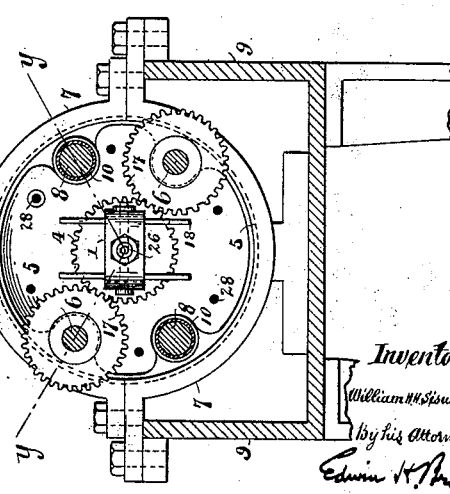
Witnesses
Inventor
William H. H. Sisum
By his Attorney (No Model.) 5 Sheets—Sheet 2.
W. H. H. SISUM.
MACHINE FOR MAKING WIRE CORDS AND CABLES.
No. 477,784. Patented June 28, 1892.
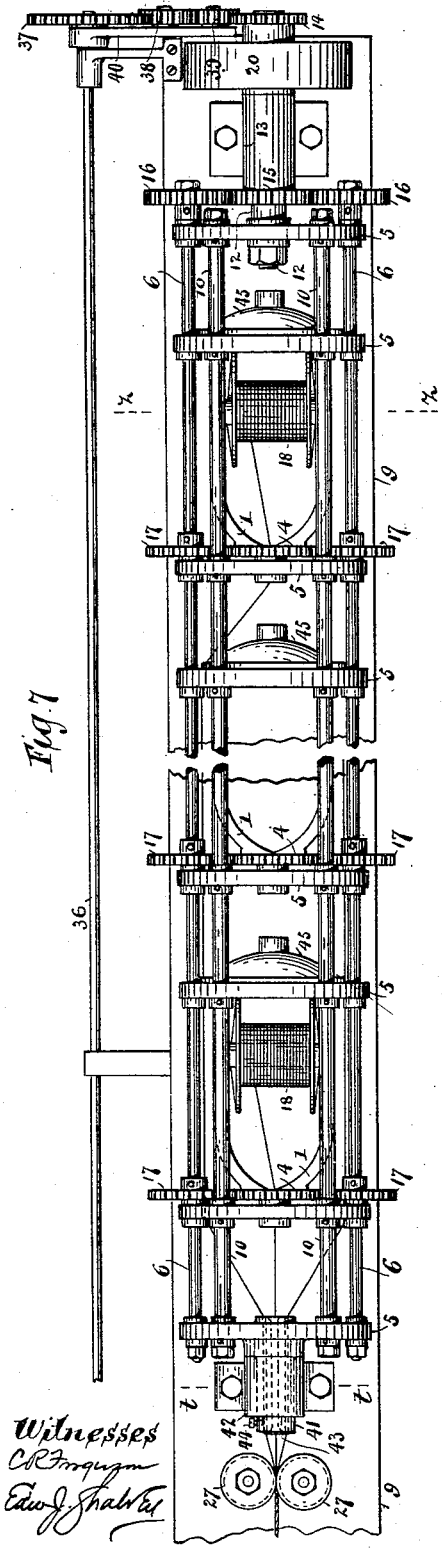
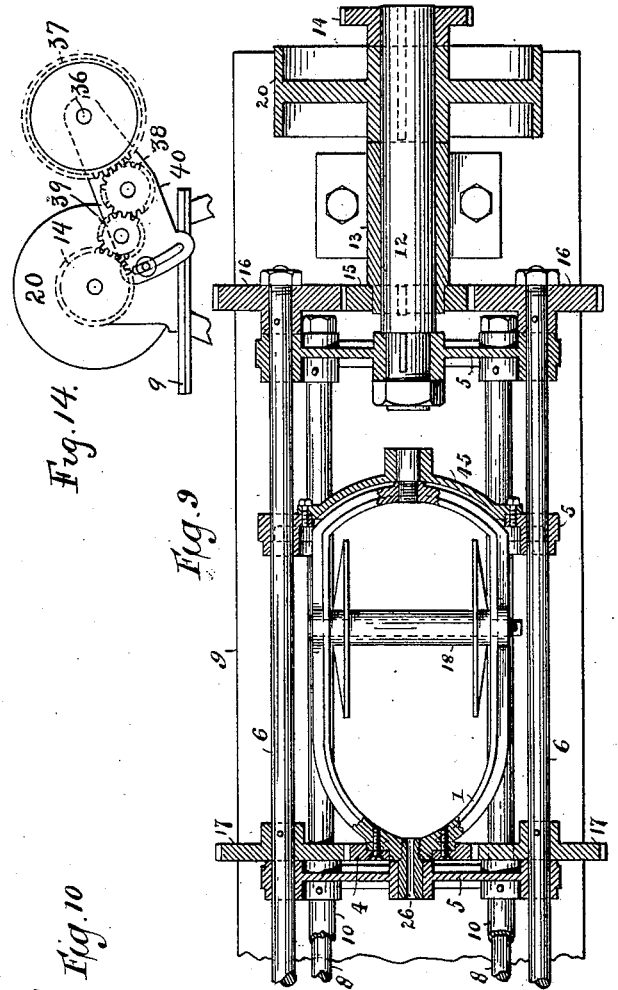
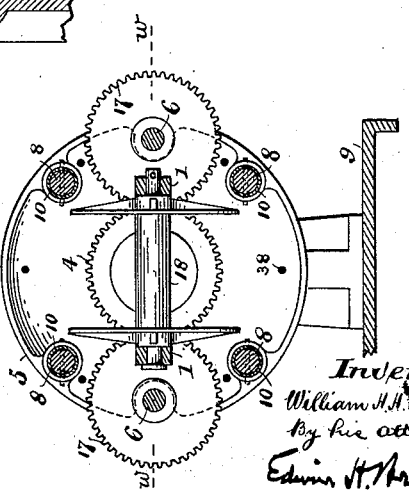
Witnesses
C. R. Ingram
Edw. J. Shalvey
Inventor
William H. H. Sisum
By his attorney
Edwin H. Brown

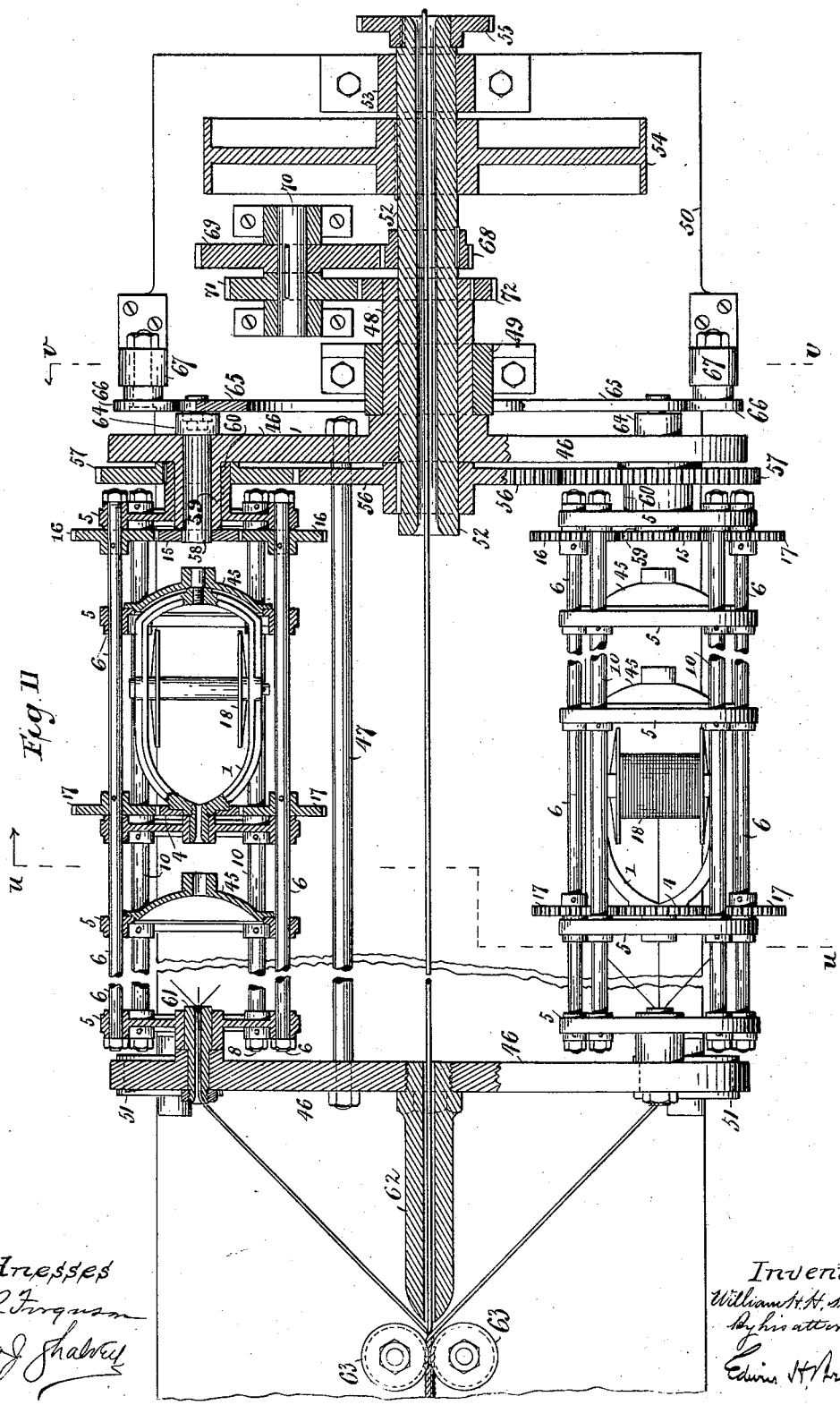

(No Model.)  5 Sheets—Sheet 4.

W. H. H. SISUM.
MACHINE FOR MAKING WIRE CORDS AND CABLES.

No. 477,784. Patented June 28, 1892.

Witnesses
C. R. Ferguson
Edward J. Shalvey

Inventor
William H. H. Sisum
By his attorney
Edwin H. Brown (No Model.) 5 Sheets—Sheet 5.
W. H. H. SISUM.
MACHINE FOR MAKING WIRE CORDS AND CABLES.
No. 477,784. Patented June 28, 1892.
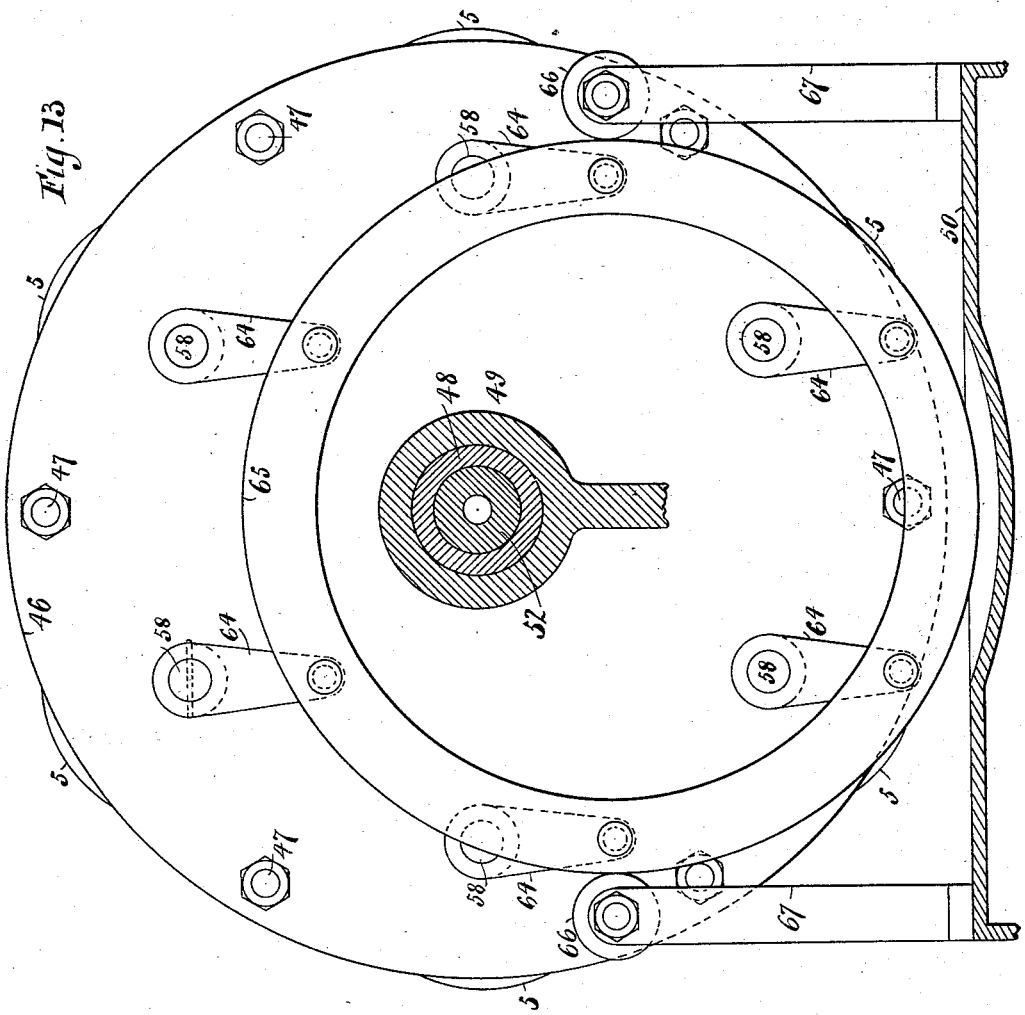

UNITED STATES PATENT OFFICE.

WILLIAM H. H. SISUM, OF BROOKLYN, NEW YORK.

MACHINE FOR MAKING WIRE CORDS AND CABLES.

SPECIFICATION forming part of Letters Patent No. 477,784, dated June 28, 1892.

Application filed December 10, 1890. Serial No. 374,147. (No model.)

*To all whom it may concern:*

Be it known that I, WILLIAM H. H. SISUM, of Brooklyn, Kings county, and State of New York, have invented a certain new and useful Improvement in Machines for Making Wire Cords and Cables, of which the following is a specification.

This improvement is specially intended for making strands or cords and cables with the use of wire.

I will describe a machine embodying my improvement, and then point out the novel features in the claims.

In the accompanying drawings, Figure 1 is a plan or top view of a machine embodying my improvement and adapted to the making of strands or cords, a certain portion being broken away between the ends to economize space. Fig. 2 is a transverse section taken at the plane of the dotted line $x\ x$, Fig. 1, and on a larger scale than Fig. 1. Fig. 3 is a horizontal section of a portion of the machine, also on an enlarged scale, taken as indicated by the dotted line $y\ y$, Fig. 2. Fig. 4 is a front elevation of one end portion of the machine illustrated in Fig. 1, with certain parts shown in section. The arrow marked adjacent to the left-hand end of Fig. 1 indicates the direction in which the view, Fig. 4, is taken. Fig. 5 is a top view of a spool, a yoke supporting the same, a tension device, and certain other parts comprised in the machine. Fig. 6 is a central longitudinal section of the parts shown in Fig. 5. Fig. 7 is a plan or top view of a machine embodying my improvement and modified slightly in construction as compared with that previously described. Fig. 8 is a transverse section taken at the plane of the dotted line $z\ z$, Fig. 7, and on a larger scale than Fig. 7. Fig. 9 is a horizontal section of a portion of the machine, also on a larger scale, taken as indicated by the dotted line $w\ w$, Fig. 8. Fig. 10 is a transverse vertical section, on an enlarged scale, taken at the plane of the dotted line $t\ t$, Fig. 7. Fig. 11 is partly a plan and partly a horizontal section of a machine embodying my improvement and designed for making cables of strands or cords. Fig. 12 is a transverse vertical section taken at the plane of the dotted line $u\ u$, Fig. 11, and looking in the direction indicated by the arrow which is marked at one end of said line. Fig. 13 is a transverse vertical section taken at the plane of the dotted line $v\ v$, Fig. 11, and looking in the direction indicated by the arrow marked at one end of this line. Fig. 14 is a rear end view of the machine.

Similar numerals of reference designate corresponding parts in all the figures.

Referring first to Figs. 1 to 6, inclusive, 18 designates a number of spools upon which wires or threads are wound. Preferably there will be seven of these spools. They are journaled in frames 1, and have combined with them brakes 2, whereby the unwinding of the wires or threads too rapidly will be prevented. The frames 1 are secured to shafts 3 and may advantageously be formed integral therewith. They have affixed to them gear-wheels 4, and their shafts 3 are loosely journaled in bearings 21, formed integral with disks 5, arranged one before the other and having shafts 6 combined with them. Certain of the disks 5 are supported in frames 7. (Best shown in Figs. 2 and 3.) Generally alternate disks 5 will be supported in frames 7 and the intermediate disks 5 will be supported by tie-rods 8, extending through all the disks 5. It will be seen by reference to Fig. 2 that the shafts 6 pass through diametrically-opposite portions of the disks 5 and that this is also true of the tie-rods 8. This arrangement of shafts and tie-rods is advantageous, as it secures a better balance of the frame which is formed by the combination of shafts, tie-rods, and disks. The frames 7 are of annular form, as may be readily understood by reference to Fig. 2, and are supported by a base-piece 9, which may be sustained by legs. These frames 7 are made in semicircular sections, so as to provide for inserting the disks, and preferably the disks will engage with these frames by a tongue-and-groove connection. As here shown, the frames 7 are provided with internal grooves and the disks 5 with external ribs fitting such grooves.

The tie-rods 8 are not intended to rotate within the disks 5, but to be rigidly connected therewith. To provide for such rigid connection, I surround these rods with tubular sleeves 10, filling the spaces between the several disks 5, and I screw-thread the extremities of the rods beyond the end disks and combine with them nuts, whereby the disks and the tubular sleeves 10 may be clamped together through the agency of the rods 8. I have shown the rods 8 as also serving to secure a driving-pulley 20 to the frame composed of the rods 8, disks 5, and their appurtenances. To provide for this I apply to each of the rods 8 beyond one of the end disks 5 a sleeve 11 and construct the driving-pulley 20 with a web, which may abut against the sleeve 11. The application of the nuts to the other side of the web will serve to clamp the pulley in place. The axis of the pulley 20, which is supported by the tie-rods 8, coincides with the axis of the frame composed of the tie-rods and disks and their appurtenances. Obviously, therefore, rotary motion imparted to this pulley by means of a belt or otherwise will cause the said frame to revolve.

The disk 5, which is nearest the pulley 20, has secured to it a shaft 12, which extends through the pulley. It is tubular at one end and internally screw-threaded to engage with an external screw-thread formed upon a hub with which said disk is provided. This shaft 12 extends through a stationary sleeve 13, supported by a bracket erected upon the bed 9. The shaft 12 has at its outer extremity a gear-wheel 14, whose function will presently be explained. The inner end of the sleeve 13 is provided with a gear-wheel 15, and the adjacent ends of the shafts 6 are provided with gear-wheels 16. When the frame carrying the shafts 6 is rotated, the gear-wheels 16 travel around the stationary gear-wheel 15 and are caused to rotate upon their own axes. Adjacent to each of the disks 5 gear-wheels 17 are affixed to the shafts 6. They engage with the gear-wheels 4, which are affixed to the frames 1, carrying the spools 18. The gear-wheels 17 and the gear-wheels 4 are of equal diameter. Hence the revolving and rotary motions of the gear-wheels 17 will hold the gear-wheels 4 against rotation. Because of this the spools will have no rotary movement. Manifestly, if a rotary movement from the spools in either direction should be desired it could readily be attained by differently proportioning the gear-wheels 4 and 17. The shafts 3 of the frames 1 may be secured within their bearings in the disks 5 by any suitable means. As here shown, the gear-wheels 4 impinge against the bearings at one end, and collars surrounding the extremities of the shafts and pinned thereto impinge against the bearings at the other end. The brakes 2, as here shown, consist of bars resting upon the wires or threads upon the spools 18 and supported by the extremities of springs 19, coiled around rods 22, mounted on the frames 1. Pins 23 engage the middle portion of the coiled springs 19 and prevent them from turning around the rods 22. The rods 22 are preferably cylindrical and fit in bearings 24, extending from the frames 1. Screws 25 passing through the bearings and engaging with the rods hold the latter in position. The tension of the brakes may of course be varied by adjustments of the rods. The frame 1 of each spool 18 is provided at the center of its forward end with an eye 26, through which the wire or thread passes as it leaves the spool. The wire or thread of the foremost spool 18 extends through the eye 26 of its frame 1 directly to a pair of rollers or rotary dies 27, mounted upon studs extending upwardly from the bed 9. Preferably on this spool will be wound some soft material, such as hemp. The wires or threads from the other spools, after leaving the eyes 26 of their frames 1, pass through holes 28 in the disks 5. Their passage to the adjacent disks will be at an angle, and owing to this the eyes of the disk which receive wires or threads from adjacent spools will preferably be lined with steel or other suitable substance. After these wires or threads leave the last or forward disk 5 they pass through holes in a spacing-disk 29, loosely mounted upon the frame 1 of the forward spool 18. The function of this disk 29 is to preserve the proper relation between the wires or threads extending from all of the spools except the front spool. The revolving of the frame, comprising the disks 5 and tie-rods 8, winds or twists around the wire or thread proceeding from the forward spool 18 all of the other wires or threads.

The strand or cord formed in this machine passes around a roller 30, thence around a roller 31, thence around the roller 30 again, and afterward to a spool or any other device, by which it will be taken up. It may pass around the rollers 30 and 31 as many times as desired. By its engagement with these rollers it is moved along and the wires or threads drawn off the spools 18. The rollers 30 31 are mounted upon shafts which are journaled in brackets erected on the bed 9 and have affixed to them gear-wheels 32, which engage with a gear-wheel 33, that is affixed to a shaft which also carries a bevel gear-wheel 34. Motion is imparted to the bevel gear-wheel 34 by a bevel gear-wheel 35, affixed to a shaft 36, supported in brackets extending from the bed 9 and having at its other end a gear-wheel 37 affixed to it. The gear-wheel 37 meshes with a gear-wheel 38, and the latter engages with a gear-wheel 39, meshing with the gear-wheel 14. The gear-wheels 38 and 39 are mounted upon studs, which are affixed to an arm 40, that is hung at one end upon the shaft 36 and at the other end clamped to the bed 9. As this arm is capable of swinging and has the studs of the wheels 38 and 39 secured to it, provision is afforded for removing the wheel 14 and substituting therefor others of different sizes. It will thus be seen that the gear-wheel 14 transmits motion to the rollers 30 and 31.

Turning now to the example of my improvement illustrated by Figs. 7 to 10, inclusive, it will be seen that the frame composed of the disks 5 and tie-rods 8 differs in respect to having four of the tie-rods, and also by reason of the fact that the disks are not supported in frames 7. Here the frame is supported at one end by a shaft 12, extending from one of the end disks 5, and at the other end by a shaft 41, extending from the other end disk. These shafts are journaled in brackets 13 and 42, respectively, erected upon the bed 9. The shaft 41 is tubular and has fitted within it a plug 43, preferably made of hardened steel. A set-screw 44, passing through the sleeve and impinging against the plug, secures it in place. The plug has a central hole and a number of longitudinal notches in its periphery. The wire or thread of the adjacent spool 18 passes through the central hole and the wires or threads of the other spools pass through the notches. After leaving the plug all the wires or threads pass between rollers or rotary dies 27.

The frame composed of the disks 5 and tie-rods 8 is revolved by means of a driving-pulley 20 on the shaft 12, mounted in the bracket 13. The frame carries shafts 6, as in the first-described example of my improvement, and these shafts are provided with gear-wheels 16 and 17. The gear-wheels 16 engage with a stationary gear 15, affixed to the bracket 13, and the gear-wheels 17 engage with gear-wheels 4, affixed to frames 1, supporting spools 18. These frames 1 are in this example of my improvement supported at both ends by means of the disks 5, and alternate disks 5 are provided with removable sections 45, which may be detached for the purpose of removing the frames.

The last-described form of my improvement is advantageous for making strands or cords of large wires or threads.

In Figs. 11, 12, and 13 a number of frames composed of disks and tie-rods and carrying spools and gearing, substantially as in the example of my improvement represented in Figs. 7 to 10, inclusive, are mounted in two heads or disks 46, connected by tie-rods 47 to form a large revolving frame. One of the heads 46 is affixed to a shaft 48, supported in a bracket 49, erected on a bed 50. The other disk or head 46 is journaled in rollers 51, erected upon said bed. These rollers have in their peripheries grooves which receive the edge of said disk or head 46. Through the shaft 48 passes a shaft 52, which also extends through a bracket 53, erected on the bed 50 and has affixed to it a driving-pulley 54 and a gear-wheel 55. The pulley 54 drives the shaft 52. The latter has affixed to it a gear-wheel 68, engaging a gear-wheel 69, affixed to a shaft 70, supported in brackets erected upon the bed 50, and having also affixed to it a gear-wheel 71. The wheel 71 engages with a gear-wheel 72, affixed to the shaft 48. In this way motion is transmitted from the shaft 52 to the shaft 48. The gear-wheel 55 is intended to transmit motion to two rollers similar to the rollers 30 31. (Illustrated in Figs. 1 and 4.) At the inner end a gear-wheel 56 is affixed to the shaft 52 and engages with gear-wheels 57, affixed to the frames formed of the disks 5, rods 8, and their appurtenances. The shafts 6 of these frames are rotated by means of gear-wheels 16, that mesh with gear-wheels 15, affixed to shafts 58, which are journaled in tubular hubs 59, extending from one of the heads 46, and serving also to support tubular hubs 60, extending from adjacent disks 5 of the frames formed of these disks, the rods 8, and their appurtenances.

I have now explained how the frames comprising the disks 5 and rods 8 are supported at one end. At the other end one of the disks 5 has a central cylindric hole fitting a tubular stud 61, extending inward from the adjacent disk or head 46. The studs 61 serve also as eyes through which pass the strands or cords formed in each of the frames comprising the disks 5 and rods 8. These strands or cords are to be twisted together around a core to form a cable. The core may be of any material; but usually it will be made of hemp or some similar soft material. It will be wound upon a drum and passed through the tubular shaft 52 and through a tube 62, extending from the head or disk 46, which is farthest from said shaft 52. This tube 62 extends almost to rollers or rotary dies 63, which are mounted upon the bed 50 and are analogous to the rollers or rotary dies 27, already described. Owing to the extension of the tube 62 close to the rollers 63, the proper relation of the several strands or cords to each other and to the core will be secured.

The shafts 58 have at their outer ends cranks 64, extending downwardly and having at their lower ends wrists, which enter holes in a ring 65. This ring 65 is suspended from the cranks and is prevented from moving bodily to one side by means of rollers 66, supported upon studs fastened to brackets 67, erected on the bed 50.

In the operation of the machine now under consideration the frame composed of the disks or heads 46 and rods 47 rotates, and as it carries the small frames comprising the disks 5 and rods 8 these small frames are revolved about the axis of the larger frame. The ring 65 prevents the shafts 58 from rotating. The small frames comprising the disks 5 and rods 8 are rotated about their own axes because of the engagement of their gear-wheels 57 with the gear-wheel 56. The gear-wheels 16 of the small frames engaging with the gear-wheels 15 thereof will impart a rotary motion to the shafts 6. The gear-wheels 17 of the shafts 6, engaging with the gear-wheels 4, which are connected with the frames 1, supporting the spools 18, prevent these frames 1 from rotating on their axes, assuming that the gears 17 and 4 are of the same size.

What I claim as my invention, and desire to secure by Letters Patent, is—

1. The combination of a frame rotating on its axis, a number of spool-frames arranged in line within the rotating frame, a shaft carried by said rotating frame, a single gear on each of the spool-supporting frames, gears on said shaft engaging with the gears on the spool-supporting frames, another gear on the outer end of said shaft, and a non-rotary gear arranged opposite the center of the rotating frame to engage with the last-named gear, substantially as specified.

2. The combination of a frame rotating on its axis, a number of spool-frames arranged in line within the rotating frame, shafts arranged at opposite points on the rotating frame and extending the entire length of the spool-frames, a single gear on each end of the spool-supporting frames, and gears on said shafts engaging therewith, substantially as specified.

3. The combination of a frame rotating on its axis, a number of spool-frames arranged in line within the rotating frame, shafts extending the entire length of and carried by said rotating frame, a single gear on each of the spool-supporting frames, gears on said shafts engaging therewith, other gears on the outer ends of said shafts, and a non-rotary gear arranged central with the rotating frame to engage with the last-named gears, substantially as specified.

4. The combination, with a number of spool-frames, of a rotary frame, take-up rollers 30 31, a shaft 12, connected with the said frame, gearing substantially such as described between said shaft 12 and the rollers 30 31, and means for shifting the bearing of certain of said gearing, substantially as specified.

5. The combination of a main frame rotating on its axis, a number of smaller frames carried by said main frame and rotating independently on their own axes, frames for supporting spools and connected with said smaller independent frames, so that there may be a relative movement between the latter and them, shafts arranged and extending the entire length of the smaller independent frames, gears carried by said shafts in the smaller independent frames and engaging gears on the spool-frame-supporting shafts, non-rotary wheels with which said gears on the smaller independent frames are engaged, eyes or guides in said smaller independent frames receiving wires, threads, or like material from said spool, and tubular studs arranged forward of the foremost spools within said smaller independent frames, substantially as specified.

6. The combination of a main frame rotating on its axis, a number of smaller frames carried by said main frame and rotating independently on their own axes, spool-supporting frames arranged within the smaller independent frames, shafts arranged in and extending the entire length of the smaller independent frames and geared to the spool-supporting frames, gears 15, gear-wheels on said shafts engaging with the gears 15, shafts 58, cranks 64 on these shafts, and a ring 65, substantially as specified.

7. The combination of a main frame rotating on its axis, a number of smaller frames carried by said main frame and rotating independently on their own axes, spool-supporting frames arranged within the smaller independent frames, shafts arranged in the smaller independent frames and geared to the spool-supporting frames, gears 15, gear-wheels on said shafts engaging with said gears 15, shafts 58, cranks 64 on these shafts, a ring 65, and stops or rollers 66, substantially as specified.

In testimony whereof I have signed my name to this specification in the presence of two subscribing witnesses.

WILLIAM H. H. SISUM.

Witnesses:
S. O. EDMONDS,
C. R. FERGUSON.